United States Patent
Herrick et al.

(10) Patent No.: US 9,513,162 B2
(45) Date of Patent: Dec. 6, 2016

(54) TUNABLE MULTI-BAND SPECTRO-POLARIMETER

(71) Applicant: RAYTHEON COMPANY, Waltham, MA (US)

(72) Inventors: Robert Bruce Herrick, La Quinta, CA (US); John F. Silny, Playa Vista, CA (US); David M. Zimmerman, La Mesa, CA (US); Joseph G. Shanks, San Diego, CA (US); Joseph P. Filice, San Diego, CA (US)

(73) Assignee: RAYTHEON COMPANY, Waltham, MA (US)

( * ) Notice: Subject to any disclaimer, the term of this patent is extended or adjusted under 35 U.S.C. 154(b) by 107 days.

(21) Appl. No.: 14/658,562

(22) Filed: Mar. 16, 2015

(65) Prior Publication Data
US 2016/0273963 A1   Sep. 22, 2016

(51) Int. Cl.
*G01J 3/28* (2006.01)
*G01J 3/02* (2006.01)
*G01V 8/10* (2006.01)

(52) U.S. Cl.
CPC ............ *G01J 3/0224* (2013.01); *G01J 3/2803* (2013.01); *G01J 3/2823* (2013.01); *G01V 8/10* (2013.01); *G01J 2003/2826* (2013.01)

(58) Field of Classification Search
CPC ...... G01J 3/0224; G01J 3/2803; G01J 3/2823; G01J 2003/2826
See application file for complete search history.

(56) References Cited

U.S. PATENT DOCUMENTS

| | | |
|---|---|---|
| 7,016,040 B2 | 3/2006 | Chen et al. |
| 7,038,776 B1 | 5/2006 | Ansley et al. |
| 7,420,675 B2 | 9/2008 | Giakos |
| 7,630,077 B2 | 12/2009 | Schultz et al. |
| 8,300,108 B2 | 10/2012 | van Hoorebeke et al. |

(Continued)

FOREIGN PATENT DOCUMENTS

EP        2 034 743 A1   3/2009

OTHER PUBLICATIONS

International Search Report and Written Opinion for PCT/US2015/062129 mailed Mar. 14, 2016.
(Continued)

*Primary Examiner* — Tony Ko
(74) *Attorney, Agent, or Firm* — Lando & Anastasi, LLP

(57) ABSTRACT

Methods and apparatus for remote, passive detection of underwater objects using combined spectral and polarimetric imaging. In one example, a tunable multi-band spectro-polarimeter includes an imaging detector array that receives electromagnetic radiation from a viewed scene, a plurality of tunable spectral filters configured to filter the electromagnetic radiation into at least first and second spectral bands, and a plurality of polarization filters configured to filter each of the first and second spectral bands into at least two different polarization states, a first region of the detector array receiving the first spectral band and producing first polarimetric image data, and a second region of the detector array simultaneously receiving the second spectral band and producing second polarimetric image data, and a controller that receives and processes the first and second polarimetric image data to detect a target object in the viewed scene.

18 Claims, 8 Drawing Sheets

(56) References Cited

U.S. PATENT DOCUMENTS

| | | | |
|---|---|---|---|
| 8,305,578 B1 | 11/2012 | Mudge et al. | |
| 2005/0264813 A1 | 12/2005 | Giakos | |
| 2013/0270421 A1* | 10/2013 | Kanamori | G02B 23/24 250/208.1 |
| 2015/0206912 A1* | 7/2015 | Kanamori | G02B 26/001 250/208.1 |

OTHER PUBLICATIONS

Meenal Kulkarni: "A survey of performance characterization for spectropolarimetric imaging systems", Apr. 29, 2013 (Apr. 29, 2013), XP55253623, Retrieved from the Internet: URL:http://wwwl.cse.wustl.edu/"jain/cse567-13/ftp/imaging.pdf [retrieved on Feb. 29, 2016] p. 2-p. 4 figure 1.

Robert Perkins et al: "Signal-to-noise analysis of Stokes parameters in division of focal plane polarimeters References and links", Appl. Opt. Appl. Opt. Appl. Opt. Opt. Lett. Opt. Express Opt. Express IEEE Sens. J. IEEE Trans. Neural Netw. Electron. Lett. Opt. Express Appl. Opt. Optics Express Appl. Opt. J. Opt. Soc. Am. A Opt. Eng. Appl. Opt, Jan. 1, 2006 (Jan. 1, 2006), pp. 5453-5469, XP055253626, Retrieved from the Internet: <URL: https://www.osapublishing.org/DirectPDFAccess/B87F4263-AF98-2C22-856CAD3959D33AD9208393/.

\* cited by examiner

TUNABLE MULTI-BAND SPECTRO-POLARIMETER

BACKGROUND

There are numerous applications in which it is desirable to be able to detect underwater objects from stand-off distances or remote locations. Some conventional approaches to the detection of underwater objects have included the use of unmanned underwater vehicles (UUVs) that search for objects within the water, and aerial vehicles (such as helicopters) that can drag nets to comb the waters for near-surface objects. Other approaches have involved the use of remote sensors, optionally deployed on buoys, or other relatively-static deployed structures on the surface of the water, that look for objects or indirect indicators of the presence of an object of interest (e.g., a vessel wake); however these methods tend to suffer from low confidence-of-detection, high false alarm rates, and/or low area coverage rates.

SUMMARY OF INVENTION

Aspects and embodiments are directed to systems and methods for passive detection of underwater objects from remote distances above the water surface. As discussed in more detail below, certain embodiments employ a combination of tunable spectral and polarimetric imaging techniques to provide wide area, high confidence detections over a variety of different environmental conditions.

According to one embodiment, a tunable multi-band spectro-polarimetric imaging system comprises an imaging detector including a two-dimensional array of pixels, an optical sub-system configured to direct the incident electromagnetic radiation from a viewed scene along an optical path to the imaging detector, a first tunable spectral filter positioned in the optical path between the optical sub-system and the imaging detector and configured to filter the incident electromagnetic radiation such that a first plurality of pixels of the array of pixels receives electromagnetic radiation in a first spectral band, a second tunable spectral filter positioned in the optical path between the optical sub-system and the imaging detector and configured to filter the incident electromagnetic radiation such that a second plurality of pixels of the array of pixels receives electromagnetic radiation in a second spectral band different than the first spectral band, a plurality of polarization filters positioned in the optical path between the optical sub-system and the imaging detector, the plurality of polarization filters being configured to selectively alter a polarization state of the incident electromagnetic radiation, such that the imaging detector receives at least three different polarizations of the electromagnetic radiation in each of the first and second spectral bands, the imaging detector being configured to produce first polarimetric image data corresponding to the first spectral band and second polarimetric image data corresponding to the second spectral band, and a processor/controller (referred to herein as a controller) configured to receive and process the first and second polarimetric image data to detect a target object in the viewed scene, and to provide control signals to the first and second tunable spectral filters to tune a wavelength range of each of the first and second spectral bands.

In one example in which the viewed scene includes a body of water, the controller is configured to tune the first tunable spectral filter to select the first spectral band as a guard band, wherein electromagnetic radiation in the wavelength range corresponding to the first spectral band does not penetrate below a predetermined threshold depth beneath a surface of the body of water. The controller is further configured to tune the second spectral filter to select the second spectral band as target band, wherein electromagnetic radiation in the wavelength range corresponding to the second spectral band penetrates below the predetermined threshold depth beneath the surface of the body of water. In processing the first and second polarimetric image data, the controller may be configured to subtract the first polarimetric image data from the second polarimetric image data to produce composite polarimetric image data. The controller may be further configured to apply a matched filter (spatial, spectral, and/or polarimetric) to the composite polarimetric image data.

In one example, the optical sub-system includes an entrance slit, foreoptics configured to direct the incident electromagnetic radiation through the entrance slit, and imaging optics configured to receive the incident electromagnetic radiation via the entrance slit, to collimate the incident electromagnetic radiation, and to focus the incident electromagnetic radiation onto a focal plane at which the imaging detector is located. The system may further comprise a spectral filter assembly positioned in the optical path ahead of the entrance slit.

In one example, the at least three polarizations include nominally 0°, 60°, and 120°.

According to another embodiment, a tunable multi-band spectro-polarimetric imaging system comprises an imaging detector array, an optical sub-system configured to direct electromagnetic radiation from a viewed scene along an optical path toward the imaging detector array, a plurality of spectral filters positioned in the optical path between the optical sub-system and the imaging detector array and configured to filter the electromagnetic radiation into at least two spectral bands such that a first region of the imaging detector array receives electromagnetic radiation in a first spectral band and a second region of the imaging detector array simultaneously receives electromagnetic radiation in a second spectral band, a plurality of polarization filters positioned in the optical path in front of the imaging detector array and configured to filter the electromagnetic radiation in each of the first and second spectral bands into at least two different polarization states, and a controller coupled to the imaging detector array, wherein the first region of the imaging detector array is configured to produce first polarimetric image data for the first spectral band, and the second region of the imaging detector array is configured to produce second polarimetric image data for the second spectral band, and wherein the controller is configured to receive and process the first and second polarimetric image data, including subtracting the first polarimetric image data from the second polarimetric image data to produce composite polarimetric data, and processing the composite polarimetric data to detect a target object in the viewed scene.

In one example, the controller is further configured to process the composite polarimetric image data to produce at least normalized Stokes parameters $S_0$, $S_1$, and $S_2$. In another example, the plurality of polarization filters includes three polarization filters positioned in front of each of the first and second regions of the imaging detector array, and the at least two different polarization states include nominally 0°, 60°, and 120°.

In another example, the imaging detector array includes a two-dimensional array of pixels, wherein the plurality of polarization filters are organized into a composite polarimetric grid filter aligned with the two-dimensional array of pixels of the imaging detector array and configured to filter the electromagnetic radiation in each of the first and second spectral bands such that the first and second polarimetric image data each includes four polarization measurements. In one example, the four polarization measurements include irradiance ($E_0$), linear horizontal polarization ($E_1$), linear 45° polarization ($E_2$), and circular polarization ($E_4$). The controller may be further configured to calculate $S_1$, a first normalized Stokes vector corresponding to the first polarimetric image data, and $S_2$, a second normalized Stokes vector corresponding to the second polarimetric image data.

In another example, the plurality of spectral filters are tunable and the viewed scene includes a body of water. The processor may be further configured to tune a first one of the plurality of spectral filters to select the first spectral band as a guard band, wherein electromagnetic radiation in a wavelength range corresponding to the guard band does not penetrate below a predetermined threshold depth beneath a surface of the body of water. The processor may be further configured to tune a second one of the plurality of spectral filters to select the second spectral band as target band, wherein electromagnetic radiation in a wavelength range corresponding to the target band penetrates below the predetermined threshold depth beneath the surface of the body of water.

Another embodiment is directed to an imaging method for detecting a submerged object in a body of water. The method may comprise acts of selectively tuning a spectral passband of a first spectral filter to pass electromagnetic radiation in guard spectral band, selectively tuning a spectral passband of a second spectral filter to pass electromagnetic radiation in a target spectral band, wherein a range of an attenuation coefficient in water of the electromagnetic radiation in the guard spectral band and a range of an attenuation coefficient of the electromagnetic radiation in the target spectral band are such that the electromagnetic radiation in the target spectral band penetrates further below a surface of the body of water than the electromagnetic radiation in the guard spectral band, simultaneously filtering the electromagnetic radiation in the guard spectral band and the electromagnetic radiation in the target spectral band into a plurality of polarization states, using an imaging detector, simultaneously obtaining first polarimetric image data from the electromagnetic radiation in the guard spectral band and second polarimetric image data from the electromagnetic radiation in the target spectral band, and processing the first and second polarimetric image data to detect the submerged object.

In one example, processing the first and second polarimetric image data includes subtracting the first polarimetric image data from the second polarimetric image data to produce composite polarimetric image data, and performing matched filter processing on the composite polarimetric image data. In one example, selectively tuning the spectral passbands of the first and second spectral filters is performed based at least in part on characteristics of the body of water. In another example, selectively tuning the spectral passbands of the first and second spectral filters is further performed based at least in part on results obtained from processing the composite polarimetric image data.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
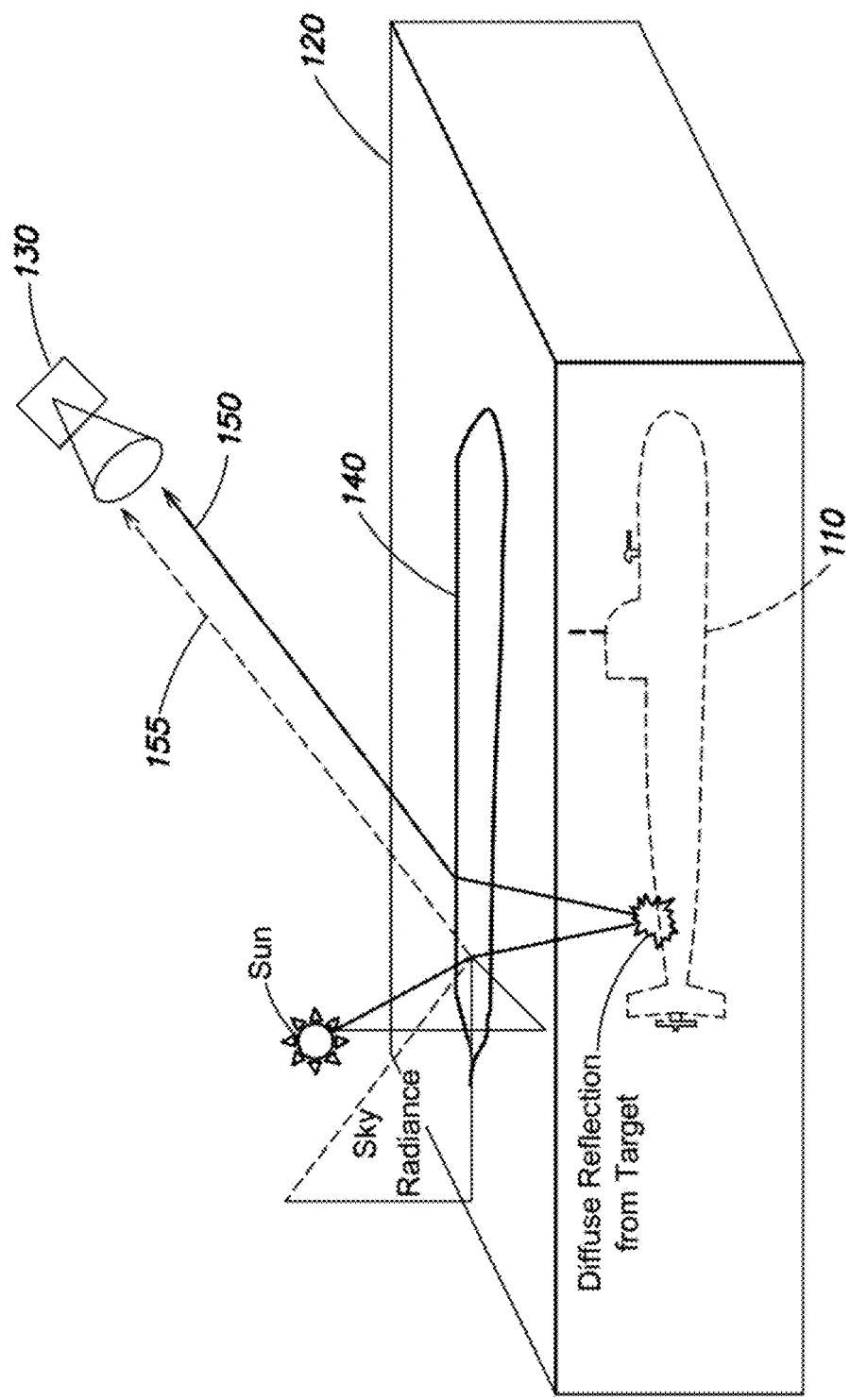
FIG. 1 is a depiction of one example of an environment in which embodiments of an imaging spectro-polarimeter according to aspects of the present invention may be used.

Aspects and embodiments are directed to passive detection of underwater objects from remote distances above the water surface. Certain embodiments include a passive electro-optical remote sensor and associated electronics configured to implement real-time detection algorithms that allow the system to perform wide-area searching for objects in or on water from a safe stand-off range. According to certain embodiments, the sensor is configured to collect multi-spectral, polarimetric images. As discussed in more detail below, the spectral bandpasses are tunable to allow for optimized clutter rejection and detections across different water states (e.g., shallow, deep, rough, calm, etc.) and background conditions. Computer-automated detections with high confidence and low false alarms may be achieved by selectively tuning the spectral bands and processing the multi-spectral and polarimetric image data using algorithms for clutter suppression. Systems and methods implementing techniques disclosed herein may achieve automated, wide-area searching that may be used to detect numerous different types of objects in or on water bodies, such as oceans, seas, or lakes, including, for example, submarines, debris, oil spills, and other submerged or partially submerged objects.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Knowledge of the polarization state of light is useful in many situations, and as a result, polarimetric imaging systems have been used in a variety of applications. For example, polarimetric imaging may be particularly useful for distinguishing man-made objects from natural objects because the two tend to have different polarimetric signatures. The polarization state of light may be specified by four observable quantities, termed its Stokes parameters, which together are termed the Stokes vector. Accordingly, imaging polarimeter systems may provide up to four data components, which correspond through mathematical operations to one or more of the four parameters of the Stokes vector. Thus, in some sense, an imaging polarimeter is similar to a three-component R,G,B color camera, except that up to four components of polarization are measured instead of three components of color.

Referring to FIG. 1, according to certain aspects it has been recognized that an object 110 submerged beneath the surface of the water 120 may leave a "scar" in the surface of appropriately processed polarization imagery. Thus, when a polarimetric imaging system 130 is used to polarimetrically image the surface of the water 120, a dark polarization "scar," 140 corresponding to the submerged object 110, may be seen against the bright polarized water surface. This occurs because light 150 received at the imaging polarimeter 130 that is reflected from the object 110 below the water surface has a polarization opposite to the reflected sky radiance 155 that is reflected from the surface of the water, thus generating the polarization scar 140. However, the polarization scar 140 corresponding to the submerged object 110 may be masked by surface or near-surface clutter in the image data. Accordingly, in certain embodiments, polarimetric data may be collected in multiple spectral bands, such that differences between the data from the different spectral bands may be used to reject the clutter and improve object detection capability.

Figure 2A:
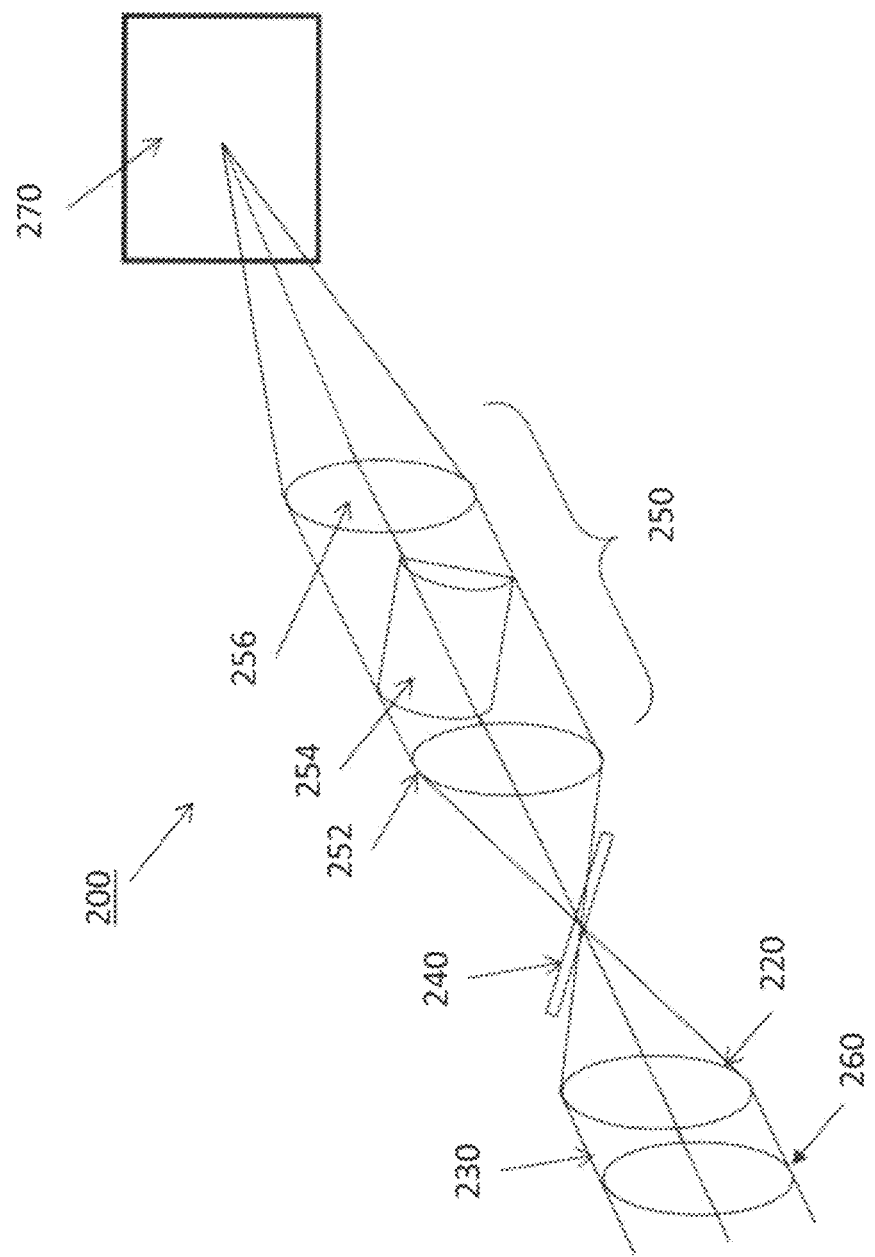
FIG. 2A is an illustration of one example of a multi-band imaging spectro-polarimeter according to aspects of the invention.
Figure 2B:
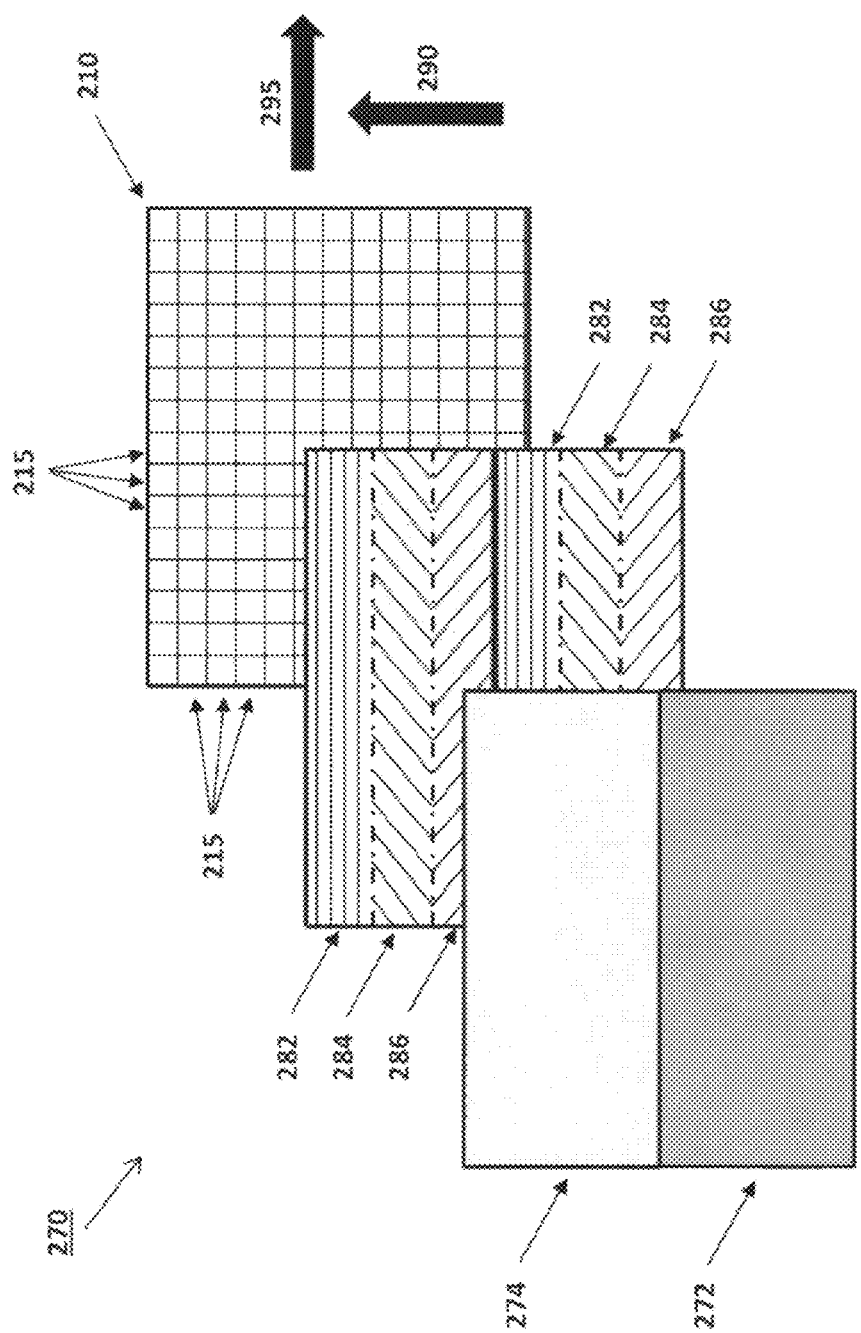
FIG. 2B is an illustration of one example of the sub-system 270 of FIG. 2A, according to aspects of the invention.

Referring to FIGS. 2A and 2B, there is illustrated one example of a scanning, tunable, multi-band spectro-polarimetric imaging system according to certain aspects. FIG. 2B illustrates a more detailed view of the imaging sub-system 270 of FIG. 2A. The system 200 is one example of the imaging polarimeter 130 of FIG. 1. The imaging sub-system 270 includes an imaging detector 210, which in some examples may be a two-dimensional focal plane array (FPA) sensor including a plurality of pixels (detector elements) 215 arranged in a two-dimensional array, as shown in FIG. 2B. The system 200 further includes foreoptics 220 that direct incident electromagnetic radiation 230 via an entrance slit 240 to imaging optics 250. The foreoptics 220 may include one or more optical elements, such as lenses and/or mirrors. In the example illustrated in FIG. 2A, the imaging optics 250 includes a collimation lens 252, a cylindrical lens 254, and a re-imaging lens 256, which focuses the electromagnetic radiation 230 onto the imaging sub-system 270. These optical elements create an image of slit 240 at each row of the detector 210 where different spectral and/or polarimetric filters may be placed. This provides a mechanism by which to collect spectro-polarimetric data with each band spatially and temporally coincident. In other examples, the imaging optics 250 may include any one or more lenses and/or mirrors configured to direct and focus the electromagnetic radiation 230 onto a focal plane (or image plane) at which the imaging detector 210 may be located. The system may further include an optional spectral filter assembly 260, as discussed further below. The example system 200 illustrated in FIGS. 2A and 2B is a scanning spectro-polarimeter, in which a projection of the slit 240 is scanned across the scene and the image of the scene is built up, line by line in the scan dimension, as is well understood by those skilled in the art. However, in other embodiments, a large format staring focal plane array may be used for the imaging detector 210, instead of a scanning detector array. In such instances, the spectral and polarimetric bands are sequentially collected over a very short interval in time.

According to one embodiment, the system 200 further includes a plurality of polarization filters and a plurality of spectral filters that are either positioned in front of the imaging detector 210 or may be integrated with the imaging detector 210. In certain examples, the spectral filters and/or polarization filters may be positioned near the focal plane of the imaging detector 210, or near the pupil of the imaging spectro-polarimeter. The spectral filters filter the incident electromagnetic radiation 230 into multiple spectral bands, and the polarization filters filter the incident electromagnetic radiation 230 into multiple polarization components.

In the example illustrated in FIG. 2B, the system includes two spectral filters 272 and 274. However, other embodiments may include more than two spectral filters. The first spectral filter 272 has a spectral passband corresponding to a first spectral range (range of wavelengths of the incident electromagnetic radiation) of interest, and the second spectral filter has a spectral passband corresponding to a second spectral range of interest. The first and second spectral ranges may be contiguous or may be separated (in wavelength/frequency) and distinct from one another. As discussed further below, the spectral filters may be tunable and/or switchable (i.e., movable into and out of the optical path to the detector 210) so as to allow imaging with different spectral bands.

In the example illustrated in FIG. 2B, the plurality of polarization filters includes three polarization filters 282, 284, 286 for each spectral band. For example, the three polarization filters may correspond to linear polarizations of 0°, 60°, and 120°. However, in other embodiments, more or fewer polarization filters may be used for each spectral band, and the polarizations may be of different values and/or types (e.g., ±45°, 90°, circular polarizations, etc.). In the example illustrated in FIG. 2B, the imaging detector 210 is arranged such that the columns of pixels 215, moving horizontally, correspond to the spatial direction (represented by arrow 295), which is parallel to the entrance slit 240, and the rows of pixels 215, moving vertically, correspond to the spectral/polarization direction (represented by arrow 290). In other words, each column of pixels 215 images the same spatial information, but pixels of different rows, in a given column, image the same spatial information with different spectral and/or polarizations depending on the row and the positioning of the spectral filters 272, 274 and polarization filters 282, 284, 286. Similarly, all pixels 215 in a given row experience the same polarization and spectral filtering, but contain different spatial information depending on the column in which the pixel lies. Thus, the imaging detector 210 simultaneously collects spectral information in multiple spectral bands and polarization information corresponding to multiple polarizations in each spectral band. Those skilled in the art will appreciate, given the benefit of this disclosure, that numerous other arrangements of the spectral and polarization filters and the pixels of the detector array may be implemented, and the example shown in FIG. 2B is merely illustrative and not intended to be limiting.

Figure 3:
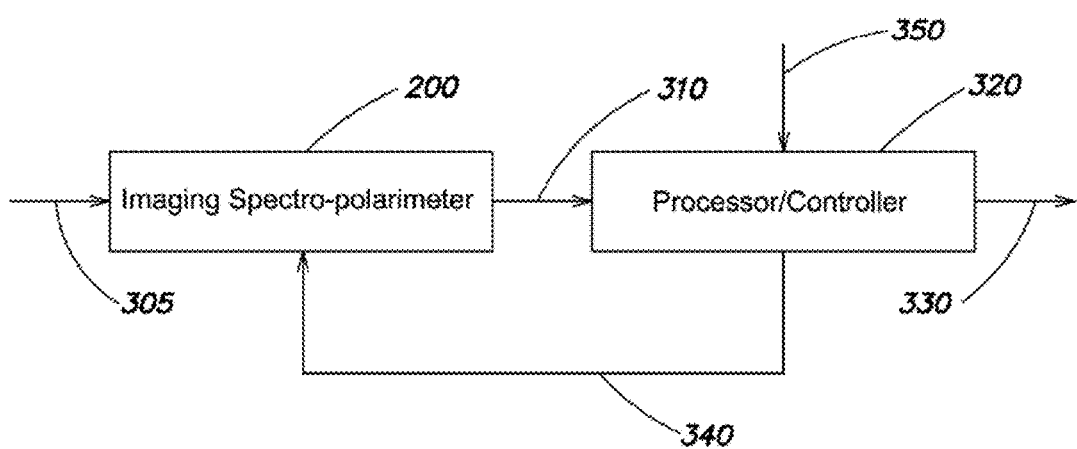
FIG. 3 is a block diagram of one example of a system incorporating a tunable multi-band imaging spectro-polarimeter according to aspects of the present invention.

Referring to FIG. 3, input electromagnetic radiation from the scene 305 is processed by the imaging spectro-polarimeter 200 to generate image data 310 that may be processed, optionally in real-time or near real-time, by a controller 320 using control parameters 350 to produce an output 330, which may include images of viewed scene and optionally indications of detection of a submerged object 110. These images and/or detection cues may be displayed to a user of any type of display screen (not shown). The controller 320 may include any type of image processor, multiprocessor, or controller capable of processing the polarimetric image data 310 according to one or more encoded algorithms and well-established image processing techniques. As discussed above, the spectral filters 272, 274 may be tunable as to their spectral passbands. In one embodiment, the controller 320 may be configured to provide tuning commands 340 to the spectro-polarimeter to tune the spectral passbands of one or more of the spectral filters, optionally in response to processing the image data 310 or to external information, such as, for example, user input or information regarding changing environmental conditions (e.g., changing water depth or characteristics such as turbidity or sea state).

As discussed above, polarimetric image data of a water body 120 may reveal an object 110 submerged beneath the surface of the water due to the polarization scar 140 that the object produces in the surface polarization images. However, near-surface clutter can mask the presence of the polarization scar, making it more difficult to accurately detect and identify submerged objects. Accordingly, in certain embodiments, the polarimetric imaging is performed in different spectral bands that are selectively tuned (through the tunable spectral filters) to achieve clutter suppression. The tunable spectral passbands may be tuned to optimize both a "pass" or "target" band and a "guard" band, with the pass band corresponding to wavelengths at which objects of interest are likely to be detected (in the presence of clutter), and the guard band corresponding to wavelengths in which clutter alone is likely to be present in the resulting image data. As such, the guard band may be used for clutter rejection, as discussed further below.

Figure 4:
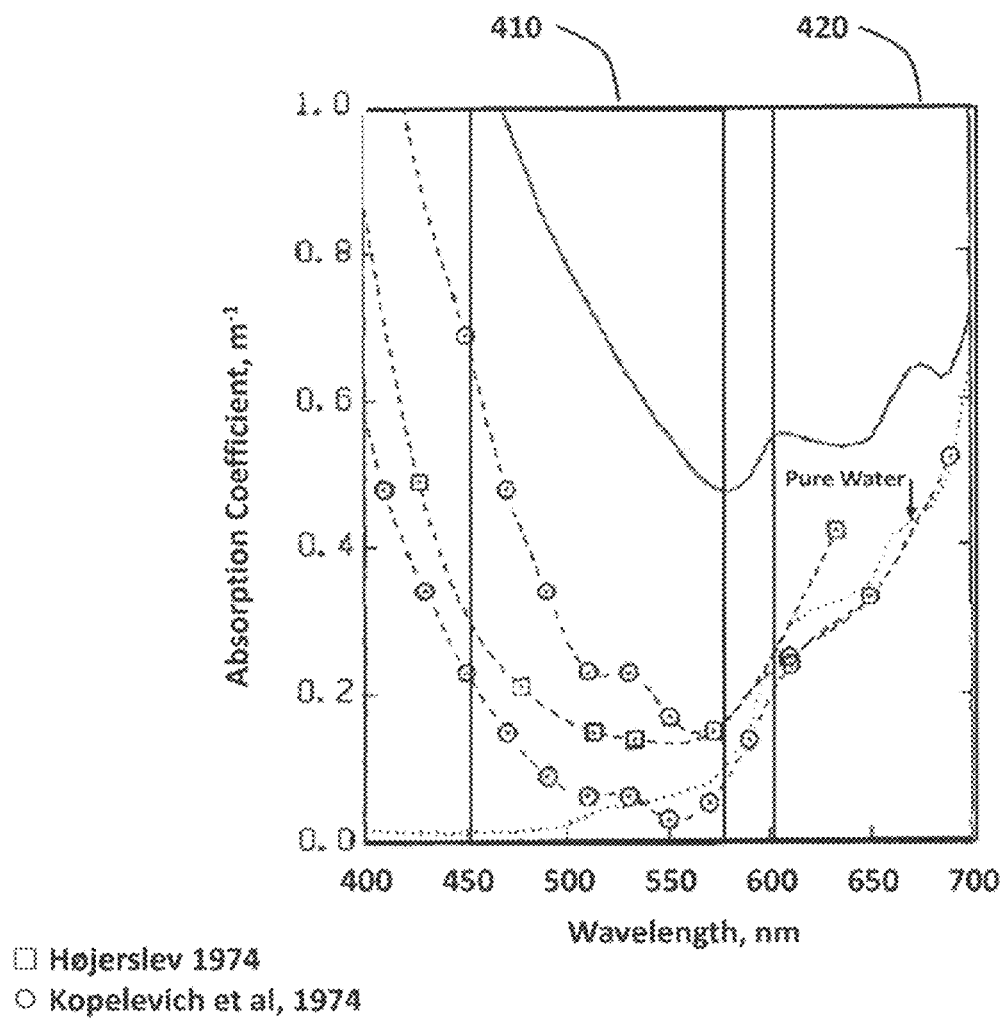
FIG. 4 is graph illustrating attenuation coefficient as a function of wavelength for various water conditions.

Different wavelengths of light are attenuated differently as they travel through water, and therefore penetrate through the water to different depths. The penetration depth of a given wavelength range may also be affected by the conditions of the water (e.g., penetration through salt water may be different than penetration depth through fresh water, for the same wavelength band). FIG. 4 is a graph illustrating the attenuation coefficient as a function of wavelength for several different water conditions (e.g., turbid coastal, clear coastal, fresh water, etc.). The graph illustrated in FIG. 4 is taken from *Limnol. Oceanogr.*, (26(4), 1981, 671-689, "An optical classification of coastal and oceanic waters based on the specific spectral absorption curves of phytoplankton pigments, dissolve organic matter, and other particular materials," Louis Prieur and Shubha Sathyendranath, Laboratoire de Phyisique et Chimie Marines, B. P. 8, La Darse, F 06230 Villefranche sur Mer, France. The lower the attenuation coefficient for a given wavelength or wavelength range, the further light at those wavelengths will penetrate through the water, and therefore be able to reflect off and allow detection of deeper submerged objects. By contrast, light at wavelengths where the attenuation coefficient is higher, will not penetrate deeply into the water, and therefore may be useful to image near-surface objects and/or features.

Figure 5A:
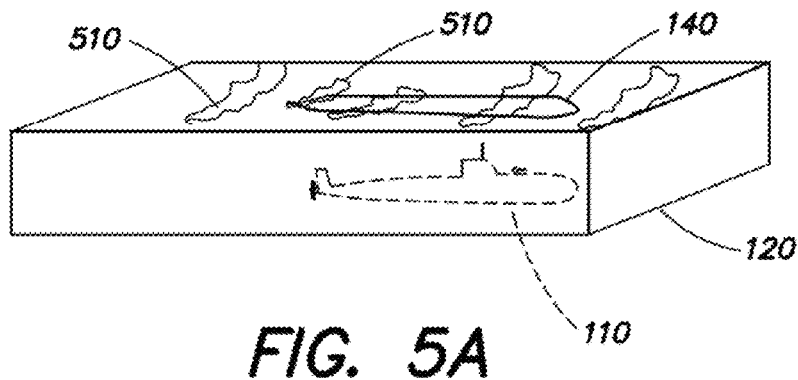
FIG. 5A is a diagram illustration of one example of polarization imagery taken in a first spectral band according to aspects of the invention.
Figure 5B:
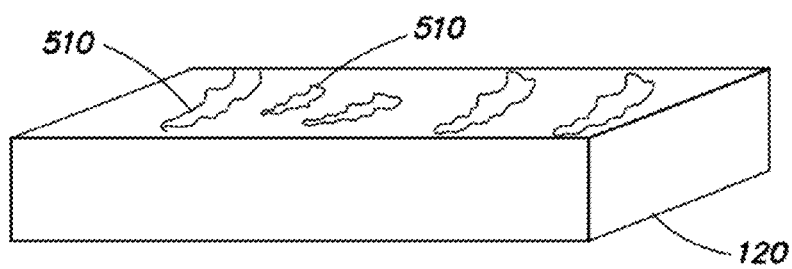
FIG. 5B is a diagram illustration of an example of polarization imagery taken in a second spectral band according to aspects of the invention.
Figure 5C:
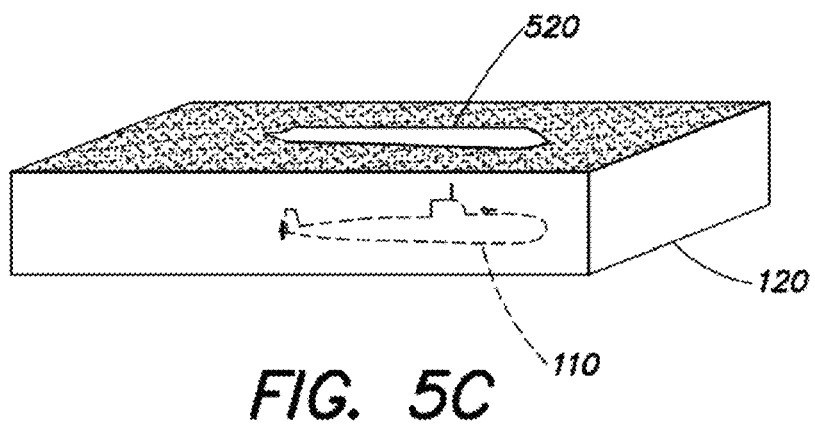
FIG. 5C is a diagram illustration of an example of polarization imagery resulting from processing the imagery in the first and second spectral bands, using the first spectral band for clutter rejection, according to aspects of the invention.

Thus, referring again to FIGS. 2A-B and FIG. 4, in one embodiment one spectral filter 272 or 274 may be selected or tuned to have a broadband spectral passband, corresponding to a depth penetration (target or pass) band 410 for example, and the other spectral filter 274 or 272 may be selected or tuned to have a spectral passband that corresponds to a guard or clutter rejection band 420, for example. Referring to FIG. 5A, polarization imagery obtained in the depth penetration spectral band may include data corresponding to both reflections from target submerged objects (e.g., the polarization scar 140 discussed above obtained after appropriate processing) and surface or near-surface clutter 510 (e.g., from reflected sky radiance and/or entrained bubbles). However, polarization imagery obtained in guard spectral band contains only the surface or near-surface clutter 510, as shown in FIG. 5B, because the light in this spectral band does not penetrate far below the surface of the water 120. The controller 320 may be configured to receive and process the polarization imagery from both the depth penetration spectral band and the guard band to essentially "subtract out" the surface clutter to reveal the imagery of the submerged target. For example, as shown in FIG. 5C, this processing may result in a bright polarization scar 520 seen against a dark water surface background.

As discussed above, the conditions of the water body 120 being searched may change due to changing environmental conditions and/or because the imaging system is moved from one location to another. Accordingly, in certain embodiments, the spectral filters are tunable such that the wavelength ranges encompassed by the depth penetration band and the guard band may be selected/adjusted to account for different conditions. In one embodiment, the spectral filters 272, 274 are implemented using liquid crystal tunable filter (LCTF) technology. In this case, the controller 320 may supply electrical control signals 340 (e.g., voltage or current) to the spectral filters 272, 274 to control the liquid crystals to tune the spectral passbands of the filters. In another embodiment, the spectral filters may be mounted on a movable structure, such as a filter wheel, which (under control of the controller 320, for example) can be rotated or otherwise moved so as to move different spectral filters having different passbands into and out of the optical path to the imaging detector 210. As also discussed above, in certain embodiments, the system 200 includes a spectral filter assembly 260 which may be used for broadband overall tuning (e.g., to set boundaries on the passbands of the tunable spectral filters 272, 274) and/or to block an unwanted passband that may be otherwise included within either or both of the passbands of the first and second tunable spectral filters 272, 274.

Figure 6A:
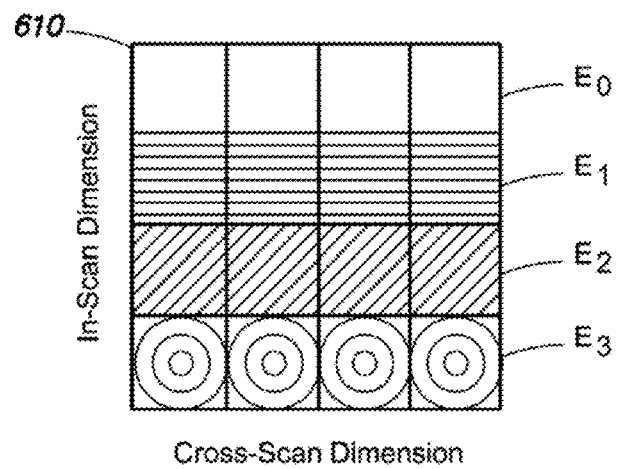
FIGS. 6A-C are illustrations of examples of polarizer patterns that may be used for the polarization filters in a scanning, multi-band imaging spectro-polarimeter according to aspects of the present invention.
Figure 6B:
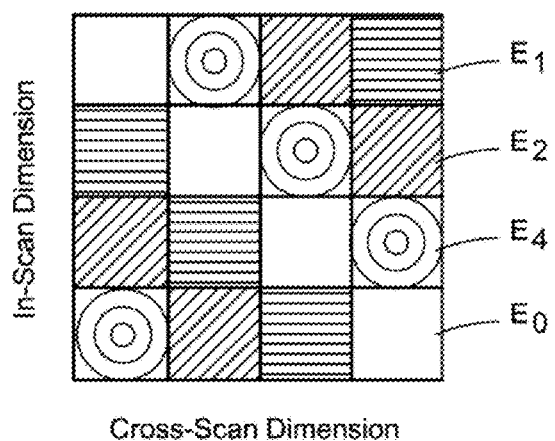
Figure 6C:
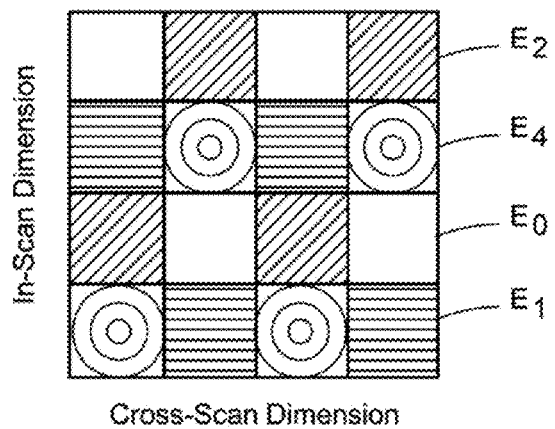

In the example of the spectro-polarimeter system 200 illustrated in FIGS. 2A and 2B, three polarization filters 282, 284, 286 are used for each spectral band, and the filters are arranged such that groups of rows of pixels 215 each receive the same polarization. However, as will be appreciated by those skilled in the art, given the benefit of this disclosure, numerous other configurations may be implemented. For example, polarimetric grid filters positioned near the focal plane of the imaging detector 210, or integrated with the imaging detector, may be used, in which the polarization of light received by each pixel 215 may be determined on a per-pixel, per-row, per-column, or per-group of pixels, basis. Similarly, although the example illustrated in FIG. 2B includes three polarization filters 282, 284, 286 configured to pass 0°, 60°, and 120° polarized light, respectively, numerous other variations may be implemented. For example, referring to FIG. 6A, there is illustrated one example of a polarimetric grid filter 610 configured for four polarization state measurements, namely irradiance ($E_0$), linear horizontal polarization ($E_1$), linear 45° polarization ($E_2$), and circular polarization ($E_3$). In the example illustrated in FIG. 2B, the filter 610 is arranged in rows, corresponding to the rows of pixels 215 in the detector array 210. FIGS. 6B and 6C illustrate other examples of polarizer patterns that provide the same four polarization state measurements. With these measurements, the Stokes parameters ($\hat{S}_n$) may be calculated as follows:

$$\hat{S}_0 = 2E_0$$

$$\hat{S}_1 = 2(E_1 - E_0)$$

$$\hat{S}_2 = 2(E_2 - E_0)$$

$$\hat{S}_3 = 2(E_3 - E_0)$$

From the above Stokes parameters, the normalized Stokes vector may be calculated as follows:

$$S = \begin{bmatrix} \hat{S}_0/\hat{S}_0 \\ \hat{S}_1/\hat{S}_0 \\ \hat{S}_2/\hat{S}_0 \\ \hat{S}_3/\hat{S}_0 \end{bmatrix} = \begin{bmatrix} S_0 \\ S_1 \\ S_2 \\ S_3 \end{bmatrix}$$

As is known to those skilled in the art, the normalized Stokes vector and its component normalized Stokes parameters, may be used to calculate two quantities that are useful in polarimetric imaging, namely degree of polarization (DOP) and degree of linear polarization (DOLP).

$$DOP = \frac{(S_1^2 + S_2^2 + S_3^2)^{1/2}}{S_0}$$

$$DOLP = \frac{(S_1^2 + S_2^2)^{1/2}}{S_0}$$

As discussed above, according to certain embodiments, polarization imaging is performed simultaneously in two or more spectral bands. Accordingly, the normalized Stokes vector or a subset of the Stokes parameters therein may be calculated for each spectral band, and the DOP and DOLP may also be calculated for each spectral band. For example, the two spectral filter embodiment illustrated in FIG. 2B, a first normalized Stokes vector, $S_A$, may be calculated for the first spectral band, and a second normalized Stokes vector, $S_B$, may be calculated for the second spectral band.

The controller 320 may be configured to process the image data 310 to obtain the normalized Stokes vectors, $S_A$ and $S_B$, and optionally the DOP and/or DOLP for each spectral band, and may be further configured to process this data to achieve the result schematically illustrated in FIG. 5C, namely, to suppress surface clutter and other noise so as improve detection of the polarization signature corresponding to a submerged target object. To this end, the controller 320 may be configured to implement any of numerous well-known signal processing techniques. In one embodiment, the controller 320 may process the normalized Stokes vectors $S_A$ and $S_B$, rather than the DOLP metric, as it has been determined that this results in improved target signal to noise ratio (SNR). In one embodiment, the normalized Stokes vectors $S_A$ and $S_B$ from both spectral bands may be combined into a single vector for processing. As will be appreciated by those skilled in the art, given the benefit of this disclosure, this may be readily extended to combine Stokes vectors from imagery obtained from more than two spectral bands into a single multi-band vector for processing.

According to one embodiment, the controller 320 is configured to implement a spectro-polarimetric matched filter algorithm that operates on combined multi-band polarimetric data. Furthermore, the matched filter may be extended to include a spatial template. For example, as discussed above with reference to FIGS. 5A-C, the guard band polarimetric image may be subtracted from the depth penetration polarimetric image to produce spectral difference polarimetric data. In one embodiment, the controller 320 is configured to calculate normalized Stokes parameters $S_1$ and $S_2$ from the spectral difference polarimetric data. In one example, a composite polarimetric imaging metric may be created based on a combination of the normalized Stokes parameters $S_1$ and $S_2$ from the spectral difference polarimetric data. In another example, the angle of polarization (AOP) may be calculated from the normalized Stokes parameters $S_1$ and $S_2$ from the spectral difference polarimetric data:

$$AOP = a\tan(S_1/S_2)$$

Figure 7:
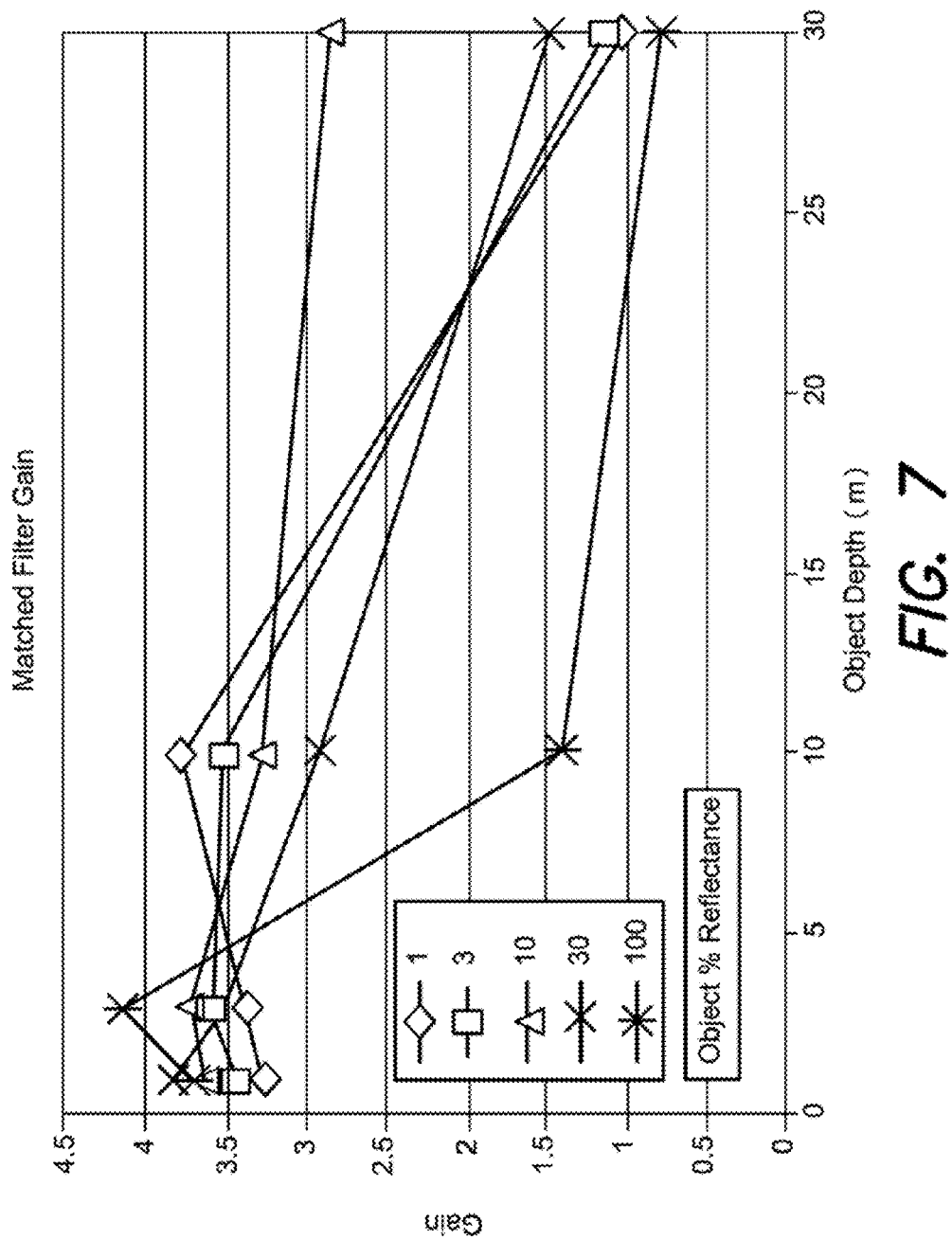
FIG. 7 is a graph illustrating matched filter gain as a function of water depth for target objects with various degrees of reflectance, according to aspects of the present invention.

The controller 320 may then perform a spatial matched filter weighted by background spatial covariance based on either of the composite polarimetric imaging metrics. As is well understood by those skilled in the art, in signal processing, a matched filter is obtained by correlating a known signal or reference with an unknown signal to detect the presence of the reference in the unknown signal. This is equivalent to correlating the unknown signal with a template of the reference. The matched filter is an optimal linear filter for maximizing SNR in the presence of additive stochastic noise. Referring to FIG. 7, applying the spectro-polarimetric matched filter to the composite multi-band, clutter-subtracted polarimetric imaging data may provide significantly enhanced detection gain over single-band imagery. For example, as may be seen with reference to FIG. 7, detection gains of over 3× are realized for objects at depths up to 10 m and object reflectances of less than 10%, resulting in confident detection with low false alarm rates of even dim (low reflectance) objects in relatively deep water. As discussed above, performance may be enhanced by tuning the spectral bands for specific reflectance, depth, and/or turbidity conditions.

Thus, aspects and embodiments may provide a tunable multi-band spectro-polarimetric imaging system and method capable of allowing confident, accurate detection of submerged objects in a wide variety of different water and environmental conditions. In particular, certain embodiments employ the use of tunable spectral filters to tune the spectral bands in which polarimetric imagery is obtained, based on factors such as the environmental conditions and characteristics of certain target objects, for example, and further employ matched filter processing so as to improve the target SNR and enhance the detection performance of the system.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A tunable multi-band spectro-polarimetric imaging system comprising:
    an imaging detector including a two-dimensional array of pixels;
    an optical sub-system configured to direct the incident electromagnetic radiation from a viewed scene along an optical path to the imaging detector;
    a first tunable spectral filter positioned in the optical path between the optical sub-system and the imaging detector and configured to filter the incident electromagnetic radiation such that a first plurality of pixels of the array of pixels receives electromagnetic radiation in a first spectral band;
    a second tunable spectral filter positioned in the optical path between the optical sub-system and the imaging detector and configured to filter the incident electromagnetic radiation such that a second plurality of pixels of the array of pixels receives electromagnetic radiation in a second spectral band different than the first spectral band;
    a plurality of polarization filters positioned in the optical path between the optical sub-system and the imaging detector, the plurality of polarization filters being configured to selectively alter a polarization state of the incident electromagnetic radiation, such that the imaging detector receives at least three different polarizations of the electromagnetic radiation in each of the first and second spectral bands, the imaging detector being configured to produce first polarimetric image data corresponding to the first spectral band and second polarimetric image data corresponding to the second spectral band; and
    a controller configured to receive and process the first and second polarimetric image data to detect a target object in the viewed scene, and to provide control signals to the first and second tunable spectral filters to tune a wavelength range of each of the first and second spectral bands.

2. The system of claim 1 wherein the viewed scene includes a body of water, and wherein the controller is configured to tune the first tunable spectral filter to select the first spectral band as a guard band, wherein electromagnetic radiation in the wavelength range corresponding to the first spectral band does not penetrate below a predetermined threshold depth beneath a surface of the body of water, the processor being further configured to tune the second spectral filter to select the second spectral band as target band, wherein electromagnetic radiation in the wavelength range corresponding to the second spectral band penetrates below the predetermined threshold depth beneath the surface of the body of water.

3. The system of claim 2 wherein, in processing the first and second polarimetric image data, the processor is configured to subtract the first polarimetric image data from the second polarimetric image data to produce composite polarimetric image data.

4. The system of claim 3 wherein the processor is further configured to apply a matched filter to the composite polarimetric image data.

5. The system of claim 1 wherein the optical sub-system includes:
    an entrance slit;
    foreoptics configured to direct the incident electromagnetic radiation through the entrance slit; and
    imaging optics configured to receive the incident electromagnetic radiation via the entrance slit, to collimate the incident electromagnetic radiation, and to focus the incident electromagnetic radiation onto a focal plane at which the imaging detector is located.

6. The system of claim 5 further comprising a spectral filter assembly positioned in the optical path ahead of the entrance slit.

7. The system of claim 1 wherein the at least three polarizations include 0°, 60°, and 120°.

8. A tunable multi-band spectro-polarimetric imaging system comprising:
    an imaging detector array;
    an optical sub-system configured to direct electromagnetic radiation from a viewed scene along an optical path toward the imaging detector array;
    a plurality of spectral filters positioned in the optical path between the optical sub-system and the imaging detector array and configured to filter the electromagnetic radiation into at least two spectral bands such that a first region of the imaging detector array receives electromagnetic radiation in a first spectral band and a second region of the imaging detector array simultaneously receives electromagnetic radiation in a second spectral band;
    a plurality of polarization filters positioned in the optical path in front of the imaging detector array and configured to filter the electromagnetic radiation in each of the first and second spectral bands into at least two different polarization states; and
    a controller coupled to the imaging detector array,
    wherein the first region of the imaging detector array is configured to produce first polarimetric image data for the first spectral band, and the second region of the imaging detector array is configured to produce second polarimetric image data for the second spectral band; and
    wherein the controller is configured to receive and process the first and second polarimetric image data, including subtracting the first polarimetric image data from the second polarimetric image data to produce composite polarimetric data, and processing the composite polarimetric data to detect a target object in the viewed scene.

9. The system of claim 8 wherein the processor is further configured to process the composite polarimetric image data to produce at least normalized Stokes parameters $S_0$, $S_1$, and $S_2$.

10. The system of claim 8 wherein the plurality of polarization filters includes three polarization filters positioned in front of each of the first and second regions of the imaging detector array, and the at least two different polarization states include nominally 0°, 60°, and 120°.

11. The system of claim 8 wherein the imaging detector array includes a two-dimensional array of pixels, and wherein the plurality of polarization filters are organized into a composite polarimetric grid filter aligned with the two-dimensional array of pixels of the imaging detector array and configured to filter the electromagnetic radiation in each of the first and second spectral bands such that the first and second polarimetric image data each includes four polarization measurements.

12. The system of claim 11 wherein the four polarization measurements include irradiance ($E_0$), linear horizontal polarization ($E_1$), linear 45° polarization ($E_2$), and circular polarization ($E_3$).

13. The system of claim 12 wherein the controller is configured to calculate $S_1$, a first normalized Stokes vector corresponding to the first polarimetric image data, and $S_2$, a second normalized Stokes vector corresponding to the second polarimetric image data.

14. The system of claim 8, wherein the plurality of spectral filters are tunable and the viewed scene includes a body of water, and wherein the controller is further configured to tune a first one of the plurality of spectral filters to select the first spectral band as a guard band, wherein electromagnetic radiation in a wavelength range corresponding to the guard band does not penetrate below a predetermined threshold depth beneath a surface of the body of water, the controller being further configured to tune a second one of the plurality of spectral filters to select the second spectral band as target band, wherein electromagnetic radiation in a wavelength range corresponding to the target band penetrates below the predetermined threshold depth beneath the surface of the body of water.

15. An imaging method for detecting a submerged object in a body of water, the method comprising:
    selectively tuning a spectral passband of a first spectral filter to pass electromagnetic radiation in guard spectral band;
    selectively tuning a spectral passband of a second spectral filter to pass electromagnetic radiation in a target spectral band, wherein a range of an attenuation coefficient in water of the electromagnetic radiation in the guard spectral band and a range of an attenuation coefficient of the electromagnetic radiation in the target spectral band are such that the electromagnetic radiation in the target spectral band penetrates further below a surface of the body of water than the electromagnetic radiation in the guard spectral band;
    simultaneously filtering the electromagnetic radiation in the guard spectral band and the electromagnetic radiation in the target spectral band into a plurality of polarization states;
    using an imaging detector, simultaneously obtaining first polarimetric image data from the electromagnetic radiation in the guard spectral band and second polarimetric image data from the electromagnetic radiation in the target spectral band; and
    processing the first and second polarimetric image data to detect the submerged object.

16. The imaging method of claim 15 wherein processing the first and second polarimetric image data includes subtracting the first polarimetric image data from the second polarimetric image data to produce composite polarimetric image data, and performing matched filter processing on the composite polarimetric image data.

17. The imaging method of claim 16 wherein selectively tuning the spectral passbands of the first and second spectral filters is performed based at least in part on characteristics of the body of water.

18. The imaging method of claim 17 wherein selectively tuning the spectral passbands of the first and second spectral filters is further performed based at least in part on results obtained from processing the composite polarimetric image data.

* * * * *